Patented Oct. 30, 1934

1,979,124

UNITED STATES PATENT OFFICE 1,979,124

PROCESS FOR THE PREPARATION IN DRY POWDERED FORM OF ANIMAL, FISH AND VEGETABLE MATTER

Henri Louis Paul Tival, Sainte-Feyre, France

No Drawing. Application February 10, 1932, Serial No. 592,190. In Great Britain February 25, 1931

21 Claims. (Cl. 99—5)

The objects of this invention are to prepare in dry powdered form all kinds of animal, fish or vegetable matter, for instance juices, milk, bile, serums, glands, meat, fish, vegetables, fruit and the like so that they will retain all the valuable properties of the freshly killed or gathered raw material and be capable of preservation for an almost indefinite period. The said valuable properties include vitamines, diastases, tannins, juices, pigments, etc. An essential object is to preserve in the powders the energy value and qualities of the living matter (animal, fish, or vegetable) at their natural strength to which the said living matter owes its specific value. Indeed it is the constituent of most value, which usually is the one first to disappear, and does so very rapidly under the effect of ferments by the method of preparation known hitherto. In order to prevent fermentation, which causes vast, harmful, detrimental changes of which the living matter is the seat, and in consequence to prevent the loss of the aforesaid valuable constituents, the applicant makes use in the known manner of the properties of refrigeration which is excellent for preserving organic matter from deterioration. As known, refrigeration also enables the raw material to be pulverized immediately and the matter in pulverized form facilitates the difficult work of desiccation.

It has already been proposed to preserve meat and other perishable food substances, by freezing and crushing or grinding the frozen substance, and subsequently desiccating the thus pulverized product. In particular it has been proposed to preserve animal gland substances by freezing and grinding when frozen and to extract the moisture therefrom by a solid absorbent which is added during the cooling or pulverization. It has also been proposed to mix a powdered absorbent with vegetable, animal or other alimentary substances, to extract moisture therefrom, and to separate the absorbent by sifting. Moreover, it has been proposed to mix with flour silica gel impregnated with a gas, to serve as a carrier of such gas.

The process according to the present invention consists in freezing solid the material to be treated and submitting it in that state once or several times to crushing by mechanical means, followed by a desiccation by adsorption whilst maintaining a temperature of below —12° C.

The freezing of the raw material is effected immediately after the slaughtering or gathering of the matter to be prepared or if it is an extract, immediately after the same has been extracted. The temperature which has been found most suitable for the majority of materials hitherto tested has been found to be —50° C. to —60° C. as this facilitates crushing.

The drying process being in the nature of a surface reaction, it is therefore necessary in order to obtain the most satisfactory results to have the largest possible exposed surface of the powdered material available and to maintain it therefore in as finely divided a state as possible so that each particle will preserve its individuality; in other words, all caking together of the frozen powder must be avoided. Practical experiments have shown that in order to maintain the finely divided state of the material under preparation the temperature of the powders must not rise above —10° C. but to do this a serious problem is encountered and that is the time required to dry the material even under a very considerable vacuum. Also fermentation though greatly retarded still takes place at —12° C., and the decomposing action will be all the greater the longer the time required for the action of desiccation. It is necessary therefore in order to do what is required, to satisfy two conditions which would appear to be practically irreconciliable, namely desiccate quickly and at the same time at a very low temperature for instance at —18° C.

Such are the two very difficult conditions which must be fulfilled to keep the powder in its finely powdered state and secure a quick desiccation so that fermentation is completely avoided and the final powder obtained entirely unaltered except for the removal of moisture.

The invention enables the above mentioned difficulties to be obviated and a product obtained which retains all the valuable properties of the original matter in its living state, and, if it happens to be an extract of such matter, a substance as near in its properties to the original as is possible is obtained.

One of the desiccation processes, and which is preferred, consists in submitting the powdered frozen material to a pressure corresponding to the point of liquefaction of ice at the treating temperature the water alone being in this manner liquefied and expressed. The temperature at which the powdered frozen material is subjected to pressure is preferably —18° C.

In order to lower the freezing point of the water for a given pressure a suitable salt may be added to the powder, preferably in a eutectic proportion to the amount of water to be expressed, or a liquid such as glycerine or alcohol may be used instead of a salt. The substance used for lowering the freezing point of the water can be added in the form of a powder frozen before or during the crushing of the raw material, the crushing of the two simultaneously giving an intimate and homogeneous mixture which facilitates the action of the salt or other substance on the ice. In this manner it is possible to maintain during the period of partial desiccation by pressure, a temperature of −25° C. to −40° C. according to the kind of salt used.

The special feature of this invention is that a rapid removal of water and moisture from the frozen powder and therefore the complete desiccation of the powder are obtained by mixing with such powder a neutral substance which will take up water and other vapours by physical affinity, in other words an adsorbent (not to be confused with absorbent) for instance charcoal, activated carbon, alumina and particularly silica gel.

The adsorbing material is introduced preferably in granular form of a size considerably larger than the particles of the powder treated. The separation of the treated powder from the adsorbent is then effected by sifting.

The following are a few examples of the sequence of operations which enable a powder to be obtained containing all the unaltered properties inherent in the living raw material.

According to one example, the organic matter, immediately taken from the living plant or creature (animal, fish or vegetable), is subjected to the immediate action of intense cold by exposing it to the effect of the evaporation and free expansion of a neutral gas, such as liquid air, or by immersion in a neutral liquid maintained at say −60° C.

The matter, thoroughly frozen and its temperature lowered to about −60° C. becomes easily crushable into an impalpable powder. The crushing is then effected by any convenient method such as a mechanical crusher which has been previously suitably chilled to prevent any rise in the temperature of the material being treated.

The solid powder obtained, still maintained at a very low temperature is subjected to a very great pressure in order to lower the freezing point of the water, or liquefying temperature of the ice, such pressure being about 2000 atmospheres for the temperature of −18° C. to which the powder is brought at this phase of the process.

The temperature of −18° C. is still required to prevent the slightest fermentation and so that under the above heavy pressure only pure water is expressed to the exclusion of any solid matter. In this manner a kind of compact cake is formed deprived of the major portion of its water, whilst no matter of a solid nature has been removed, contrary to what happens ordinarily when pressing takes place without freezing and at ordinary temperature. The cake deprived of water is subjected to another cooling to −60° C. and then finely crushed. The frozen powder is mixed in suitable proportion with precooled silica gel. The mixture is then poured into an airtight tank maintained at a constant desiccating temperature of −18° C. and subjected to the action of a good vacuum.

The use of an adsorbent, in particular silica gel, for the drying of the powder, has many important advantages over the use of chemical absorbents and other methods of evaporating and of condensing water vapour at low temperatures.

It is not necessary, for instance, to provide a condensing chamber, the condensation taking place in the pores of the adsorbent mixed with the powder.

The drying chamber or receptacle used for desiccation is all that is required as the water vapour is immediately condensed and removed by the adsorbent at the very source of its formation.

The desiccation takes place rapidly and completely under conditions which it would be impossible to satisfy in any other way; because in evenly mixed powder and silica gel, each grain of silica gel creates around it a free evaporating surface, and this occurs in the body of the mass itself, the water vapour given off by the powder grains having no distance at all to travel before adsorption.

The rate of drying increases with the richness of the mixture in silica gel or other adsorbent and the time necessary for desiccation to take place remains the same for any given powder containing the same proportion of adsorbent. This is true whatever the quantity of material being prepared whereas in ordinary processes the time needed for drying increases with the quantity of material treated.

It is clear that it is far better to mix in close contact with each other the powdered material and the drying agent than to place them in separate compartments. Furthermore no gases harmful to the powder to be dried are emitted as is the case when sulfuric acid is employed to absorb the water vapour Lastly, after desiccation the powder is separated from the silica gel simply by sifting.

It will be noted that from the time the organ, flesh, serum, or other matter is separated from the carcass of the freshly killed creature or from the plant the desiccation takes place under the protective influence of very low temperature, the temperature not rising at any time above −18° C. unless there is a special reason for carrying out the process at a temperature more nearly approaching zero centigrade.

Another example is given below and which is for obtaining beef in powder form.

The meat removed from the carcass immediately after the animal has been slaughtered is cut into pieces of about 10 cubic centimeters and placed in a suitable cutting machine similar to the vegetable cutting machines which are commonly used. The pieces are pressed against knives set in honeycomb form, by a plunger and are cut into long thin strips. The cutting machine is fixed to the top of the inside of a refrigerated chamber in which a brine of calcium chloride or magnesium chloride, or other suitable non-freezing medium such as alcohol or other liquid, cooled to −50° C. or −60° C. is available in a suitable receptacle and the surface of which is in close proximity to the honeycomb knives. As the strips of meat fall from the knives they fall into the refrigerating liquid and freeze into hard brittle sticks. It will be noted that in this way the living tissue is rapidly brought into a perfect state of anabiosis immediately after slaughter.

A belt conveyor carries the frozen sticks from the brine or other liquid used to a crusher which is also conveniently placed in the refrigerated chamber and is therefore at the same temperature as the brine. The sticks of beef undergo a preliminary rapid but coarse crushing (yielding a granular material the grains of which are about the size of canary-seed) which facilitates handling and storage. It then undergoes another but very thorough pulverization in a suitable mill to obtain an impalpable powder of a grain of the order of a micron, being all the time maintained at a temperature of −60° C.

The powder thus obtained is brought to a temperature of −18° C. and subjected in a suitable press to a pressure of 2000 atmospheres, which melts the ice and expresses the pure water contents. The conglomerated mass which is formed is again cooled to −60° C. and again pulverized and then mixed with twice its volume of granulated silica gel and brought up to −20° C. The mixture is then poured into a vacuum tank and the temperature kept at −18° C. which is the desiccation temperature. A revolving drum fitted with vanes ensures the constant renewal of surface contact. The desiccation is normally complete in 30 to 40 minutes and the beef powder is separated from the granulated silica gel or other adsorbent by sifting through a sieve of suitable mesh.

It is easy to understand also that for the preservation of very active substances disappearing very rapidly after death, it is worth while treating certain animal organs such as thyroid, suprarenal glands, spleen, etc., at an even lower protective temperature than that given above.

To lower the temperature of the first desiccation by pressure, use may be made of the well known phenomenon whereby the melting point of ice is lowered when the molecules of the ice are in contact with the molecules of certain substances such as sodium chloride, calcium chloride, magnesium chloride, alcohol, glycerine, etc. The pressure brought to bear on the mixture brings about a reduction of volume, this causes the melting of the ice which occurs at the same time as the dissolution of the salt and alcohol, which further reduces the melting point. By combining the two effects of pressure and mixture, it is possible to eliminate the greater part of the water contained in biological powders at temperatures of −25° C., −30° C., and even −40° C.

The melting of the ice will be all the more rapid and the dissolving of the salt all the more complete, the more compact and homogeneous the compressed powder.

The thawing medium (salt or liquid) should be added in a specified proportion to the water content of the biological powder, so as to obtain liquefaction with or without applying pressure and so that all the salt or liquid shall be expelled with the expressed water. This solution should be brought as near as can be to the eutectic point.

A third example is given below:

Treatment of spleen which contains 80% of water by the above method is effected by freezing the entire organ, in whatever numbers desired, to −60° C. and adding 40% by weight of sodium chloride precooled to −60° C. The proportion of 1:2 of the salt and water corresponds roughly to the eutectic point of this mixture. The pulverization secures the desired intimate mixing of the two substances.

Granular silica gel is added to the powder obtained from a second crushing of the cake resulting from the pressing process and the whole is then subjected for a period of 1½ hours to desiccation by a vacuum at −30° C.

The material, mixed with a substance lowering the melting point of ice can also be subjected in a liquid state at about −30° C. with or without pressure being applied, to sterilization by ultraviolet rays for instance, to the action of centrifugal separation to lixiviation, or dialysis.

An example of the use of the process for the production of milk powder is given below:

Milk is poured into a non-freezing liquid refrigerant which is at an extremely low temperature. The milk is immediately congealed and forms a coagulated mass which consists of all the solid matter contained in the milk. This can be collected without loss in a suitable cloth by filtration. The collected mass is then subjected to pressing and the water is thereby expressed. The resulting mass is treated in the manner already described i. e. refrozen, crushed, and dried under vacuum in conjunction with silica gel.

In all cases where silica gel is used as the adsorbent the silica gel may itself exert a sterilizing action on the material treated.

The sterilizing action by the silica gel can be promoted by causing the silica gel, before the mixture thereof with the powdered substance to be treated, to adsorb a suitable antiseptic substance, such as the antiseptics known by the trade names of "formol" and "quinosol," or alkaline hypochlorites, such as sodium hypochlorite, and the like.

After the separation by sifting, the silica gel or other adsorbent can be reactivated for use again.

I claim as my invention:

1. A process for the preparation in dry powdered form of animal and vegetable matter, comprising freezing the material to be treated to a solid condition, mechanically crushing the solid frozen material to a powdered form, and subjecting the powdered frozen material to a pressure corresponding to the melting point of ice at the prevailing temperature to express the moisture contained in the material.

2. A process for the preparation in dry powdered form of animal and vegetable matter, comprising freezing the material to be treated to a solid condition, mechanically crushing the solid frozen material to a powdered form, adding a substance for lowering the melting point of ice contained therein, and subjecting the material to a pressure corresponding to the modified melting point of the ice at the prevailing temperature to express the water content.

3. A process for the preparation in dry powdered form of animal and vegetable matter, comprising freezing the material to be treated to a solid condition, mechanically crushing the solid frozen material to a powdered form, adding a substance, for lowering the melting point of ice, to the powdered material in eutectic proportions to the water contained therein, and subjecting the mixture to a pressure corresponding to the modified melting point of the ice at the prevailing temperature to express the water content.

4. A process for the preparation in dry powdered form of animal and vegetable matter, comprising freezing the material to be treated to a solid condition, mechanically crushing the solid frozen material to a powdered form, subjecting the powdered frozen material to a pressure corresponding to the melting point of ice at the prevailing temperature to express the moisture contained in the material, pulverizing the substantially dried material at a low temperature, intimately mixing the powder with a desiccating adsorbent, and separating the adsorbent from the material after adsorption of its moisture content.

5. A process for the preparation in dry powdered form of animal and vegetable matter, comprising freezing the material to be treated to a solid condition, mechanically crushing the solid frozen material to a powdered form, adding a substance, for lowering the melting point of ice, to the powdered material in eutectic proportions to the water contained therein, subjecting the mixture to a pressure corresponding to the modified melting point of the ice at the prevailing temperature to express the water content, pulverizing the substantially dried material at a low temperature, intimately mixing the powder with a desiccating adsorbent, and separating the adsorbent from the material after adsorption of its moisture content.

6. A process for the preparation in dry powdered form of animal and vegetable matter, comprising freezing the material to be treated to a solid condition, mechanically crushing the solid frozen material to a powdered form, subjecting the powdered frozen material to a pressure corresponding to the melting point of ice at the prevailing temperature to express the moisture contained in the material, pulverizing the substantially dried material at a low temperature, intimately mixing the powder with adsorbent silica gel, and separating the silica gel from the powdered material after its moisture content has been adsorbed in the silica gel.

7. A process for the preparation in dry powdered form of animal and vegetable matter, comprising freezing the material to be treated to a solid condition, mechanically crushing the solid frozen material to a powdered form, adding a substance, for lowering the melting point of ice, to the powdered material in eutectic proportions to the water contained therein, subjecting the mixture to a pressure corresponding to the modified melting point of the ice at the prevailing temperature to express the water content, pulverizing the substantially dried material at a low temperature, intimately mixing the powder with adsorbent silica gel, and separating the silica gel from the powdered material after its moisture content has been adsorbed in the silica gel.

8. A process as set forth in claim 4, in which the adsorbent is impregnated with an antiseptic before mixing it with the powdered frozen material.

9. A process as set forth in claim 6, in which the adsorbent is impregnated with an antiseptic before mixing it with the powdered frozen material.

10. A process for the preparation in dry powdered form of animal and vegetable matter, comprising freezing the material to be treated to a solid condition, mechanically crushing the solid frozen material to a powdered form, subjecting the powdered frozen material to a pressure corresponding to the melting point of ice at the prevailing temperature to express the moisture contained in the material, pulverizing the substantially dry material at a low temperature, intimately mixing the powder with a desiccating adsorbent, subjecting the mixture to a vacuum, and finally separating the adsorbent from the powdered frozen material.

11. A process for the preparation in dry powdered form of animal and vegetable matter, comprising freezing the material to be treated to a solid condition, mechanically crushing the solid frozen material to a powdered form, adding a substance, for lowering the melting point of ice, to the powdered material in eutectic proportions to the water contained therein, subjecting the mixture to a pressure corresponding to the modified melting point of the ice at the prevailing temperature to express the water content, pulverizing the substantially dry material at a low temperature, intimately mixing the powder with a desiccating adsorbent, subjecting the mixture to a vacuum, and finally separating the adsorbent from the powdered frozen material.

12. A process for the production of milk powder, comprising pouring freshly obtained milk into a liquid refrigerant maintained at a temperature low enough to immediately freeze the milk to a solid form, removing the frozen milk, and subjecting the frozen milk to a pressure corresponding to the melting point of the frozen water contained therein to express the water therefrom.

13. A process for the production of milk powder, comprising pouring freshly obtained milk into a liquid refrigerant maintained at a temperature low enough to immediately freeze the milk to a solid form, removing the frozen milk, adding a substance thereto for lowering the melting point of the ice contained therein, and subjecting the mixture to a pressure corresponding to the modified melting point of the ice to express the water from the milk.

14. A process for the production of milk powder, comprising pouring freshly obtained milk into a liquid refrigerant maintained at a temperature low enough to immediately freeze the milk to a solid form, removing the frozen milk, subjecting the frozen milk to a pressure corresponding to the melting point of the frozen water contained therein to express the water therefrom, grinding the frozen milk, mixing it with an adsorbent to remove the remainder of the water therefrom, and then separating the adsorbent from the milk.

15. A process for the production of milk powder, comprising pouring freshly obtained milk into a liquid refrigerant maintained at a temperature low enough to immediately freeze the milk to a solid form, removing the frozen milk, adding a substance thereto for lowering the melting point of the ice contained therein, subjecting the mixture to a pressure corresponding to the modified melting point of the ice to express the water from the milk, grinding the frozen milk, mixing it with an adsorbent to remove the remainder of the water therefrom, and then separating the adsorbent from the milk.

16. A process for the preparation in dry powdered form of animal and vegetable matter, comprising freezing the material to be treated to a solid condition, mechanically crushing the solid frozen material to a powdered form, adding a substance for lowering the melting point of ice contained therein, and separating the melted water therefrom.

17. A process for the preparation in dry powdered form of animal and vegetable matter, comprising freezing the material to be treated to a solid condition, mechanically crushing the solid frozen material to a powdered form, adding a substance for lowering the melting point of ice to the powdered material in eutectic proportions to the water contained therein, and separating the eutectic solution therefrom.

18. A process for the preparation in dry powdered form of animal and vegetable matter, comprising freezing the material to be treated to a solid condition, mechanically crushing the solid frozen material to a powdered form, adding a substance for lowering the melting point of ice contained therein, and intimately mixing the material with an adsorbent to effect drying thereof.

19. A process for the preparation in dry powdered form of animal and vegetable matter, comprising freezing the material to be treated to a solid condition, mechanically crushing the solid frozen material to a powdered form, adding a substance for lowering the melting point of ice contained therein, intimately mixing the material with a silica gel adsorbent, and effecting adsorption of the moisture contained in the material.

20. A process for the preparation in dry powdered form of animal and vegetable matter, comprising freezing the material to be treated to a solid condition, mechanically crushing the solid frozen material to a powdered form, adding a substance for lowering the melting point of ice contained therein, and intimately mixing the material with an adsorbent to effect drying thereof, the mixture of powder and salt being made at a determined temperature for regulating the speed of liquefaction with the speed of adsorption of the adsorbent and the mixture of the complex powder and salt with the adsorbent being made also at the same temperature.

21. A process for the preparation in dry powdered form of animal and vegetable matter, comprising freezing the material to be treated to a solid condition, mechanically crushing the solid frozen material to a powdered form, adding a substance for lowering the melting point of ice contained therein, intimately mixing the material with a silica gel adsorbent, and effecting adsorption of the moisture contained in the material, the mixture of powder and salt being made at a determined temperature for regulating the speed of liquefaction with the speed of adsorption of the adsorbent and the mixture of the complex powder and salt with the adsorbent being made also at the same temperature.

HENRI LOUIS PAUL TIVAL.